(12) United States Patent
Wang et al.

(10) Patent No.: US 12,437,543 B2
(45) Date of Patent: Oct. 7, 2025

(54) METHOD AND DEVICE FOR EVENT DISPLAYING, STORAGE MEDIUM, AND ELECTRONIC DEVICE

(71) Applicant: BOE Technology Group Co., Ltd., Beijing (CN)

(72) Inventors: Xiaohong Wang, Beijing (CN); Yuhai Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 448 days.

(21) Appl. No.: 17/915,632

(22) PCT Filed: Sep. 8, 2021

(86) PCT No.: PCT/CN2021/117177
§ 371 (c)(1),
(2) Date: Sep. 29, 2022

(87) PCT Pub. No.: WO2022/089020
PCT Pub. Date: May 5, 2022

(65) Prior Publication Data
US 2023/0136403 A1 May 4, 2023

(30) Foreign Application Priority Data
Oct. 30, 2020 (CN) .......................... 202011192148.1

(51) Int. Cl.
*G06V 20/52* (2022.01)
*G06T 7/20* (2017.01)
(Continued)

(52) U.S. Cl.
CPC ............... *G06V 20/52* (2022.01); *G06T 7/20* (2013.01); *G06T 7/70* (2017.01); *G06V 10/72* (2022.01);
(Continued)

(58) Field of Classification Search
None
See application file for complete search history.

(56) References Cited

U.S. PATENT DOCUMENTS

2010/0275140 A1* 10/2010 Ishii .................. G06F 16/58
715/764
2020/0296536 A1 9/2020 Ashkenazi et al.

FOREIGN PATENT DOCUMENTS

CA          3029583 A1 *  7/2019   ........... G06F 3/1438
CN        106408348 A      2/2017
(Continued)

OTHER PUBLICATIONS

Poibrenski et al, M2P3 Multimodal Multi-Pedestrian Path Prediction by Self-Driving Cars With Egocentric Vision, Mar. 30, 2020, Association for Computing Machinery.*
(Continued)

*Primary Examiner* — David Ometz
(74) *Attorney, Agent, or Firm* — XSENSUS LLP (57) ABSTRACT

A method and device for event displaying, a computer-readable storage medium, and an electronic device. The method comprises: acquiring parameter information of multiple users in a preset area (S110); determining, on the basis of parameter information, the probabilities of events to be displayed being triggered (S120); and determining, on the basis of the probabilities, a duration for displaying said events in the preset area (S130). The method overcomes the problem of data resource wastage in the prior art in which a greater number of invalid events are displayed when displaying events without taking into consideration parameter information of users.

20 Claims, 4 Drawing Sheets

Acquire multiple events to be displayed and acquire parameter information of multiple users in a preset area — S110

Determine, on the basis of the parameter information, the probabilities of said events being triggered — S120

Determine, on the basis of the probabilities, a duration for displaying said events in the preset area — S130

(51) Int. Cl.
*G06T 7/70* (2017.01)
*G06V 10/72* (2022.01)
*G06V 40/20* (2022.01)

(52) U.S. Cl.
CPC .... *G06V 40/20* (2022.01); *G06T 2207/30201* (2013.01); *G06T 2207/30241* (2013.01); *G06T 2207/30242* (2013.01)

(56) References Cited

FOREIGN PATENT DOCUMENTS

| | | | | |
|---|---|---|---|---|
| CN | 110363590 | A | 10/2019 | |
| CN | 111309230 | A | 6/2020 | |
| CN | 111353455 | A | 6/2020 | |
| CN | 111381909 | A | 7/2020 | |
| CN | 111506643 | A | 8/2020 | |
| CN | 112307966 | A | 2/2021 | |
| KR | 102139524 | B1 * | 7/2020 | ............ G06V 20/41 |
| WO | 2017/035970 | A1 | 3/2017 | |
| WO | 2020/134571 | A1 | 7/2020 | |
| WO | 2020/199662 | A1 | 10/2020 | |
| WO | WO-2021073267 | A1 * | 4/2021 | ............ G06V 40/20 |

OTHER PUBLICATIONS

International Search Report and Written Opinion mailed on Nov. 22, 2021, in corresponding PCT/CN2021/117177, 8 pages.
Office Action issued on Aug. 1, 2022, in corresponding Chinese patent Application No. 202011192148.1, 16 pages.
Office Action issued on Feb. 25, 2023, in corresponding Chinese patent Application No. 202011192148.1, 14 pages.

* cited by examiner

METHOD AND DEVICE FOR EVENT DISPLAYING, STORAGE MEDIUM, AND ELECTRONIC DEVICE

CROSS-REFERENCE TO RELATED APPLICATIONS

The present disclosure is the U.S. national phase application of PCT Application No. PCT/CN2021/117177, filed on Sep. 8, 2021, which is based on and claims priority to the Chinese patent application No. 202011192148.1, filed on Oct. 30, 2020, and titled "METHOD AND DEVICE FOR EVENT DISPLAYING, STORAGE MEDIUM, AND ELECTRONIC DEVICE", the entire contents of each are incorporated herein by reference.

TECHNICAL FIELD

The present disclosure relates to the technical field of information displaying, in particular to a method and device for event displaying, a computer-readable storage medium and an electronic device.

BACKGROUND

With the development of displaying technology, a method for displaying events in some places using displaying devices is broadly applied.

In the prior art, a greater number of invalid events are displayed when displaying the events without taking parameter information of users into consideration, to cause data resource wastage.

It should be noted that the information disclosed in the above "Background" section is merely intended to reinforce understanding of the background technology of the present disclosure, accordingly the Background may include information that does not constitute the prior art as already known by an ordinary person skilled in the art.

SUMMARY

According to a first aspect of the present disclosure, a method for event displaying is provided. The method includes:
acquiring a plurality of events to be displayed, and acquiring parameter information of a plurality of users in a preset area;
determining probabilities of the events to be displayed being triggered according to the parameter information;
determining a duration of the events to be displayed in the preset area according to the probabilities.

In an exemplary embodiment of the present disclosure, the parameter information includes user data information, and acquiring the parameter information of the plurality of users in the preset area includes:
acquiring face information of the users in the preset area;
matching the user data information of the users in an information base according to the face information.

In an exemplary embodiment of the present disclosure, the parameter information further includes user behavior information, and acquiring the parameter information of the plurality of users in the preset area includes:
detecting a movement trajectory of the user in a preset time;
determining the user behavior information according to the preset time and the movement trajectory.

In an exemplary embodiment of the present disclosure, the preset area includes at least one of display devices, and the method further includes:
acquiring position information of each of the display devices;
determining a display position of the event to be displayed according to the user behavior information and the position information;
wherein the display device is configured to display the event to be displayed.

In an exemplary embodiment of the present disclosure, determining the display position of the event to be displayed according to the user behavior information and the position information, includes:
detecting a number of users in a preset range of the display devices;
determining the display position of the event to be displayed according to the number of users and the probabilities.

In an exemplary embodiment of the present disclosure, determining the probabilities of the events to be displayed being triggered according to the parameter information, includes:
acquiring a pre-trained neural network model, and an input of which refers to the parameter information of the plurality of users, and an output of which refers to the probabilities of the events to be displayed being triggered;
inputting the parameter information of the users into the neural network model, and determining the probabilities of the events to be displayed being triggered.

In an exemplary embodiment of the present disclosure, the duration of the event to be displayed is positively correlated with the probability of the event to be displayed.

According to an aspect of the present disclosure, a device for event displaying includes:
an acquisition module configured to acquire a plurality of events to be displayed and acquire parameter information of a plurality of users in a preset area;
a first determining module configured to determine probabilities of the events to be displayed being triggered according to the parameter information; and
a second determining module configured to determine a duration of the events to be displayed in the preset area according to the probabilities.

According to an aspect of the present disclosure, a computer-readable storage medium on which a computer program is stored is provided, and the program, when executed by a processor, implements the method for event displaying as described in any one of the above embodiments.

According to an aspect of the present disclosure, an electronic device is provided. The electronic device includes:
one or more processors; and
a memory configured to store one or more programs, so that the one or more processors implement(s) the method for event displaying as described in any one of the above embodiments when the one or more programs are executed by one or more processors.

BRIEF DESCRIPTION OF THE DRAWINGS

The accompanying drawings, which are incorporated in and constitute part of this specification, illustrate embodiments consistent with the invention and, together with the description, serve to explain the principles of the invention. Apparently, the drawings in the following description are only for illustrating some embodiments of the present disclosure and those of ordinary skill in the art can also derive other drawings based on the drawings without paying any creative labor. In the drawings.

DETAILED DESCRIPTION

Now, the exemplary implementations will be described more completely with reference to the accompanying drawings. However, the exemplary implementations can be implemented in various forms and should not be construed as limiting the implementations as set forth herein. Instead, these implementations are provided so that the present disclosure will be thorough and complete, and concept of the exemplary implementation will be fully conveyed to a skilled person in the art. The described features, structures or characteristics may be combined in one or more embodiments in any appropriate way.

In addition, the drawings are only schematic illustrations of the present disclosure and are not necessarily drawn to scale. In the drawings, the same reference numbers in the drawings refer to the same or similar parts, and the repeated descriptions will be omitted. Some of the block diagrams shown in the drawings are functional entities, which do not necessarily correspond to physically or logically independent entities. These functional entities can be implemented in a form of software, or in one or more hardware modules or integrated circuits, or in different networks and/or processor devices and/or microcontroller devices.

Figure 1:
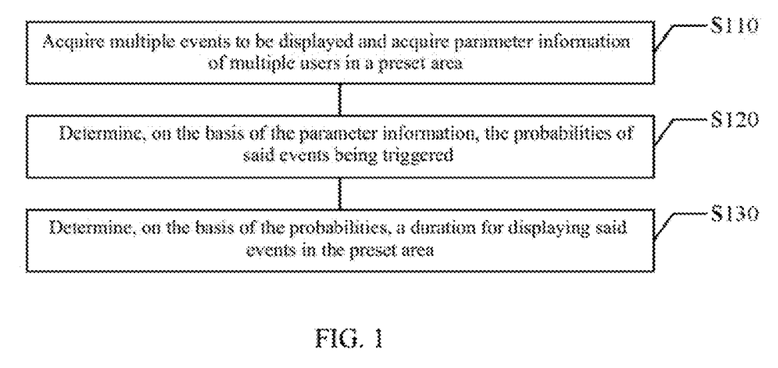
FIG. 1 schematically shows a flowchart of a method for event displaying according to an exemplary embodiment of the present disclosure.

In this exemplary embodiment, it is provided with a method for event displaying, which may be applied to banks, cinemas and other places. Referring to FIG. 1, the above-mentioned method for event displaying may include following steps:

S110, acquiring a plurality of events to be displayed, and acquiring parameter information of a plurality of users in a preset area;

S120, determining probabilities of the events to be displayed being triggered according to the parameter information;

S130, determining a duration of the events to be displayed in the preset area according to the probabilities;

According to the method for event displaying provided in this exemplary embodiment, as compared with the prior art, the probabilities of the events to be displayed being triggered are determined according to the parameter information of the plurality of users, and the duration of the events to be displayed is determined according to the probabilities, and the parameter information of the users is taken into consideration, so that the duration of the event to be displayed is further determined, and the probabilities of the event to be displayed being triggered is increased, the display effectiveness is improved, and data resources are saved.

Hereinafter, steps of the method for event displaying in this exemplary embodiment will be explained in more detail with reference to the drawings and embodiments.

S110, acquiring a plurality of events to be displayed, and acquiring parameter information of a plurality of users in a preset area.

In an exemplary embodiment of the present disclosure, a plurality of events to be displayed may be acquired first, wherein the events to be displayed may be varied according to different application scenarios. For example, when the application scenario is in a bank, the events to be displayed may be main businesses of the bank, such as processing credit cards and processing a time deposit; and when the application scenario is in a cinema, the events to be displayed may be main businesses of the cinema, such as movie ticket packages, and movie recommendations. In this exemplary embodiment, the events to be displayed are not specifically limited thereto.

In this exemplary embodiment, parameter information of the plurality of users in the preset area may be acquired, wherein the preset area may be an area for displaying the events to be displayed, such as a bank service hall and a cinema hall, which is not specifically limited thereto.

In this exemplary embodiment, a plurality of display devices may be included in the preset area, for displaying the above-mentioned events to be displayed, and a server may acquire position information of the above-mentioned display devices, and at the same time, the server is connected with the above-mentioned display devices to display the events to be displayed on the above-mentioned display devices.

The description will be made in detail by taking the bank service hall as an example of the preset area. In this exemplary embodiment, the parameter information of the user may include face information of the user, emotion information of the user analyzed according to the face information, and user data information, wherein the user data information may include age, gender, occupation, income and other data of the user. The parameter information may also include information on the number of users in the preset area.

Specifically, the face information may be labeled, user ID identification may be configured, the user data information may be acquired from the information base by using the face information, and the data information may be associated with the user ID identification.

In this exemplary embodiment, collection of the face information may be acquired by an image acquisition device installed in the preset area, wherein the image acquisition device may be a camera, and the camera may be a monocular camera or a binocular camera, which is not specifically limited thereto.

In this exemplary embodiment, the information on the number of users in the preset area may be acquired by an infrared sensor, or the information on the number of users in the preset area, that is, the number of users may be calculated by recordation of the user's in and out by using entrance and exit cameras in the preset area.

In this exemplary embodiment, the parameter information may also include user behavior information. It may be a movement trajectory of each of the user in a preset time, and the user behavior information may be determined according to the preset time and the movement trajectory.

Specifically, based on video stream data acquired by a multi-channel network monitoring camera, deep learning algorithm may be used to realize user detection, tracking and re-identification, for example, identifying different users by unified ID, acquiring positions of the user in real time, analyzing each frame of video data to acquire user position information, assigned ID and time stamp information, and packaging them into a data packet. When there are 3 users in the preset area, the information that may be packaged is:

```
"track":[
    {"userID":1, "x":1, "y":2.5, "collectTime":1599622687000},
    {"userID":2, "x":3.5, "y":4, "collectTime":1599622687000},
    {"userID":3, "x":2.8, "y":6, "collectTime":1599622687000}
]
```

The "userID" is an unique user trajectory ID identifications assigned by the user identified by the algorithm, "x" and "y" are two-dimensional coordinates of the user in the preset area, and "collectTime" is a data collection time at this time.

The server may track the user's position in the preset area, identify the user's identity by using the collected user face information, bind and associate the user trajectory identification userID assigned by the movement trajectories of the user with the user face identification faceID assigned by the face taken as virtual information. The association method is used to judge a distance between two points by identifying a user-side coordinate (fx,fy) through the face of user and identifying a current user (x,y) in a trajectory system, when the distance is closest, the association between the userID and the faceID is established, due to such binding of distance=$\sqrt{(x-fx)^2+(y-fy)^2}$, the several user trajectory ID identifications userID are approached to user face ID identifications faceID due to occlusion (or overlapping), superposition (or coincidence) and other reasons, meanwhile, correction should be made according to the stored historical trajectory and the restored information captured by the camera as the position information of the users who entered cannot be accurately by the camera. At this time, the user trajectory ID identification and the user face ID identification may be judged and pre-associated according to an approximate distance, and binding of the user trajectory ID identification and the user face ID identification may be realized by combination of two association results, and thus an accurate detection of the user's movement trajectory within the place can be achieved.

In this exemplary embodiment, the server may determine the number of users in the preset range of each of the display devices according to the user behavior information.

In step S120, probabilities of the events to be displayed being triggered are determined according to the parameter information.

In one exemplary embodiment of the present disclosure, the server may determine the probabilities that the event to be displayed is triggered according to the parameter information. Specifically, the server may acquire a neural network model, and then acquire historical data which is taken as training data and may be acquired from the information base, and the historical data may be used as the training data to train the neural network model. An input of the trained neural network model refers to the parameter information, and an output refers to the probabilities that the events to be displayed are triggered.

In this exemplary embodiment, the training data may be the parameter information of user and information whether to trigger the events to be displayed, that is, the parameter information of the user and trigger data corresponding to the plurality of events to be displayed, such as age, gender, occupation, income and other information of the users, and information whether the events to be displayed is triggered by each of the users, which may use "1" for being triggered, and "0" for not being triggered. For example, the events to be displayed may be an A-event, a B-event, or a C-event, and if the trigger data corresponding to a first user is [1,0,1], it means that the first user triggers the A-event and the C-event, without triggering the B-event. For another example, if the trigger data of a second user is [1,1,1], it means that the second user triggers the A-event, the B-event and the C-event at the same time.

After the neural network model is acquired, the parameter information of the user and the event to be displayed may be input into the neural network model, and then the probabilities of the event to be displayed being triggered may be acquired.

For example, the parameter information includes information such as age, gender, occupation, and income of the user, and the events to be displayed may be an A-event, a B-event, and a C-event. At this time, the age, gender, occupation, income and other information of the users are input into the neural network model, and the A-event, B-event and C-event may also be input into the neural network model. An output may be represented as a probability of A-event being triggered, for example 85%, a probability of B-event being triggered, for example 65%, and a probability of C-event being triggered, for example 70%. For example, it may also be represented as a probability of A-event being triggered, for example 90)%, a probability of B-event being triggered, for example 80%, and a probability of C-event being triggered, for example 70%/o.

In step S130, a duration of the events to be displayed in the preset area is determined according to the probabilities.

In one exemplary embodiment of the present disclosure, after the probabilities of the events to be displayed being triggered are acquired, a duration of each of the events to be displayed in the preset area may be determined according to the probabilities, wherein the probabilities may be positively correlated with the above-mentioned durations. For example, when the probability of A-event being triggered is 85%, the probability of B-event being triggered is 65%, and the probability of C-event being triggered is 70%, a ratio of durations of A-event, B-event and C-event in the preset area may be 85:65:70. For another example, when the probability of A-event being triggered is 90%, the probability of B-event being triggered is 80%, and the probability of C-event being triggered is 70%, the ratio of the durations of A-event, B-event and C-event in the preset area may be 9:8:7.

In this exemplary embodiment, it is also possible to collect the information of the number of users in the preset range of each of the display devices, that is, the number of users in the preset range of each of the display devices, and then determine a display position of the event to be displayed according to the number of users and the probabilities, wherein the preset range may be a range within which a distance from the display device is less than or equal to a preset distance, and the preset distance may be 10 m, 11 m, or the like, which is not specifically limited thereto.

Figure 2:
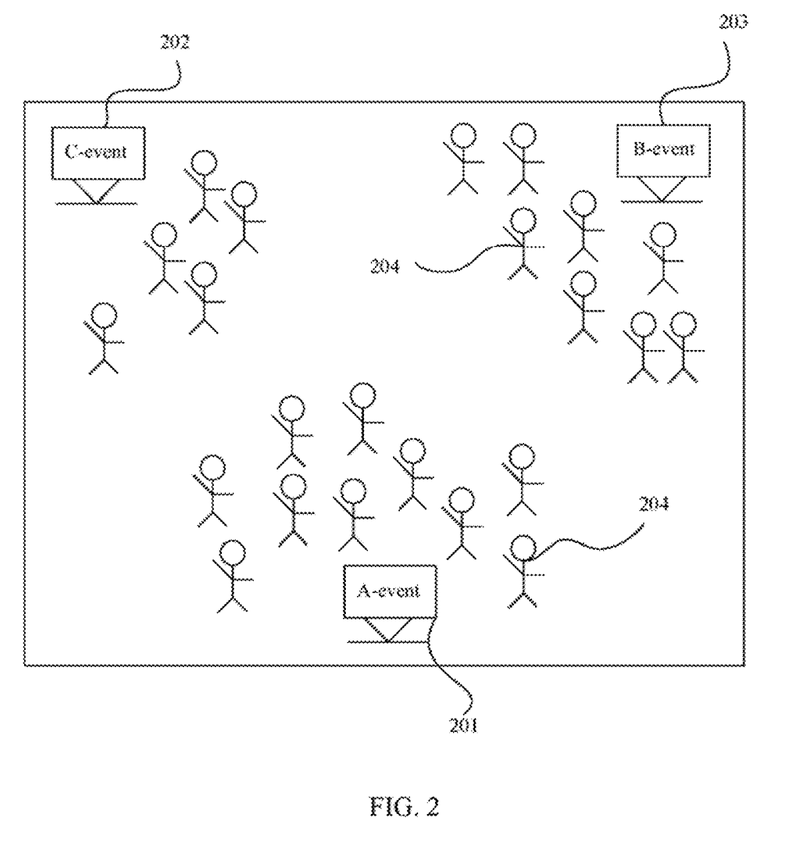
FIG. 2 schematically shows a schematic view of user distribution around a display device according to an exemplary embodiment of the present disclosure.

For example, as shown in FIG. 2, the display device includes a first display device 201, a second display device 202, and a third display device 203. When the number of users 204 around the first display device 201 is 10, the number of users around the second display device 202 is 5, and the number of users 204 around the third display device 203 is 8, while the probability of A-event being triggered is 90%, the probability of B-event being triggered is 80, and the probability of C-event being triggered is 70%, the A-event with higher probability may be displayed on the first display device having a greater number of users, the B-event may be displayed on the third display device, and the C-event may be displayed on the second display device.

In this exemplary embodiment, when the number of users in the preset range of the display device is 0, the display device is turned off to save resources, and when the number of users in the preset range of the display device is not 0, the display device is controlled by the server to be turned on.

In this exemplary embodiment, a facial attractiveness may also be scored by a facial attractiveness scoring model according to the face information of the user, so as to enhance the interest of user and increase a stay time of the user in the preset range, and further enable the user to watch the events to be displayed for a longer time. For example, in the bank scenario, a virtual loan amount related to the score of facial attractiveness may be given depending on a score of facial attractiveness of the user.

In an exemplary embodiment of the present disclosure, referring to FIG. 3, steps S310 to S330 may be further included, and the above steps will be described in detail as follows:

step S310, detecting a current temperature and a current humidity in the preset area, and setting a preset temperature range and a preset humidity range;

step S320, sending a temperature adjustment signal when the current temperature is not within the preset temperature; and step S330, sending a humidity adjustment signal when the current humidity is not within the preset humidity.

In this exemplary embodiment, the server may acquire temperature information and humidity information in the preset area, and set a preset temperature range and a preset humidity range, wherein the preset temperature range may be 15° C. to 18° C., which is a comfortable temperature range for human body, and may also be customized according to requirements of the users, and the preset humidity range may be 30% to 60%, which is a comfortable humidity range for human body. In this exemplary embodiment, the preset temperature range and the preset humidity range are not specifically limited thereto.

When the temperature information is not within the preset temperature range, the server may send the temperature adjustment signal such that the temperature in the preset area is within the preset temperature range, so as to ensure to comfort the user and enable the user to watch the events displayed by the display device for a longer time.

Similarly, when the humidity information is not within the preset humidity range, the server may send the humidity adjustment signal such that the humidity in the preset area is within the preset humidity range, so as to ensure to comfort the user and enable the user to watch the events displayed by the display device for a longer time.

Further, the server may also detect brightness in the preset area, and set a preset brightness range, wherein the brightness range may be customized according to requirements of the users, which is not specifically limited thereto.

When the brightness information is not within the preset brightness range, the server may send a brightness adjustment signal, so that the brightness in the preset area is within the preset brightness range, so as to ensure to comfort the user and enable the user to watch the events displayed by the display device for a longer time.

Figure 4:
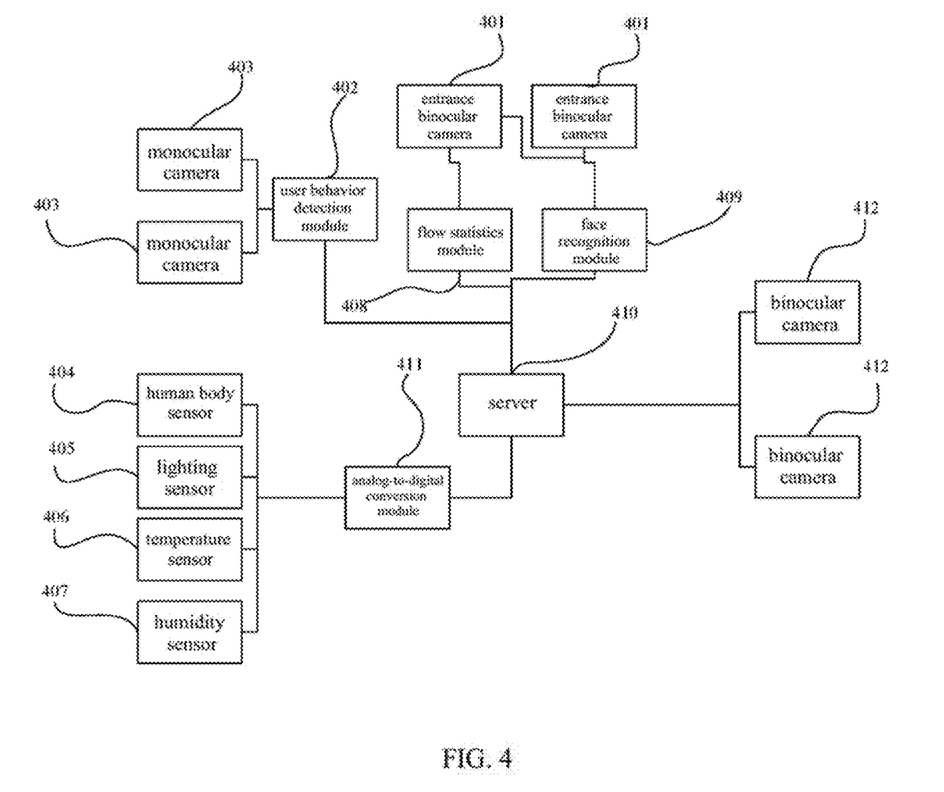
FIG. 4 schematically shows a frame schematic view of various detecting devices according to an exemplary embodiment of the present disclosure.
Figure 5:
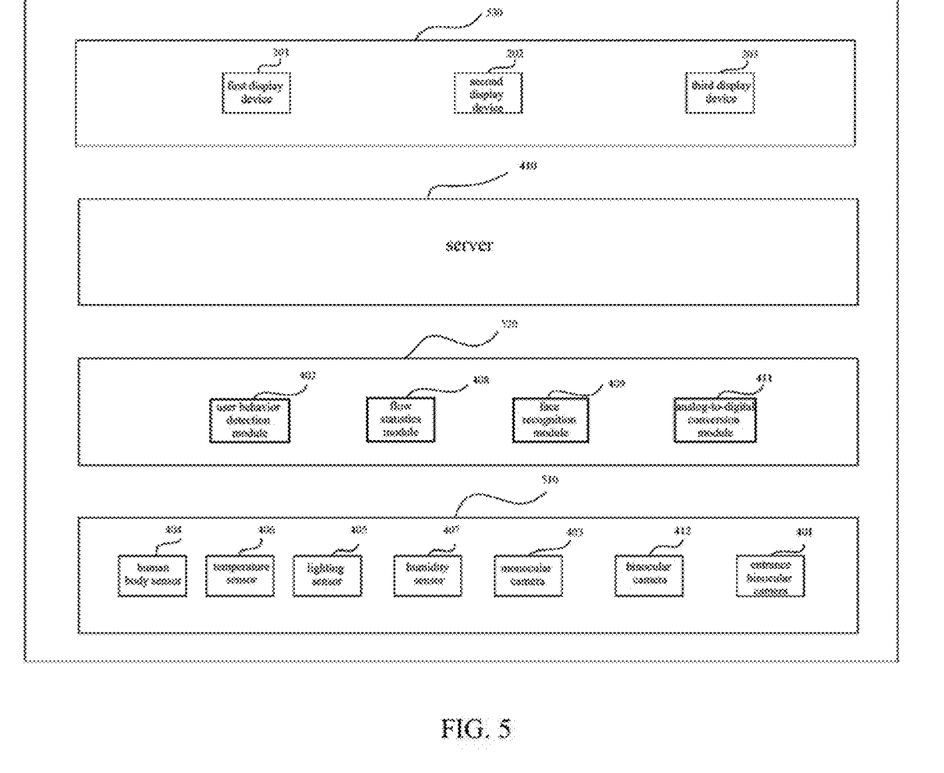
FIG. 5 schematically shows an overall architecture view according to an exemplary embodiment of the present disclosure.

In this exemplary embodiment, as shown in FIGS. 4 and 5, at least one entrance binocular camera 401 may be provided at an entrance to collect a flow amount of users, and the flow amount of users may be recorded into the server 410 through a flow statistics module 408 to determine the information of the number of users in the preset area, and at the same time, the face data of the user may be collected and transmitted to the server 410 through a face recognition module 409. The user data information may be acquired via the server, the user behavior information may be detected by a monocular camera 403 and a user behavior detection module 402, the number of users around the display device may be determined by a human body sensor 404, the brightness information in the preset area may be collected by a lighting sensor 405, and the temperature information and the humidity information may be collected by a temperature sensor 406 and a humidity sensor 407, wherein the temperature sensor, the humidity sensor and the lighting sensor are all connected with an analog-to-digital conversion module 411 for transmitting data to the server 410. A binocular sensor may also be used to detect and re-collect the face information and upload it to the server, so that the server may score the user's facial attractiveness by the facial attractiveness scoring model, to improve the interest, enable the user to stay in the preset area for a longer time, increase the probability of the events to be displayed being watched, and increase the probability of the events to be displayed being triggered.

In this exemplary embodiment, a specific implementation framework of this solution may be divided into a perception terminal layer, an edge service layer, a data processing layer and a display layer. All of the temperature sensor 406, the humidity sensor 407, the human body sensor 404, the lighting sensor 405, the monocular camera 403, the binocular camera 412 and the entrance binocular camera 401 are of the perception terminal layer 510, and the perception terminal layer may be used to collect the parameter information. All of the user behavior detection module 402, the flow statistics module 408, and the face recognition module 409, and the analog-to-digital conversion module 411 are of the edge service layer 520, and the edge service layer is used to pre-process the collected parameter and upload it to the data processing layer (i.e., the server). The above-mentioned server 410 is in the data processing layer, and is used to process the collected data and obtain the probability of the events to be displayed being triggered. The first display device 201, the second display device 202 and the third display device 203 are of the display layer 530, and are used to display the events to be displayed.

Figure 6:
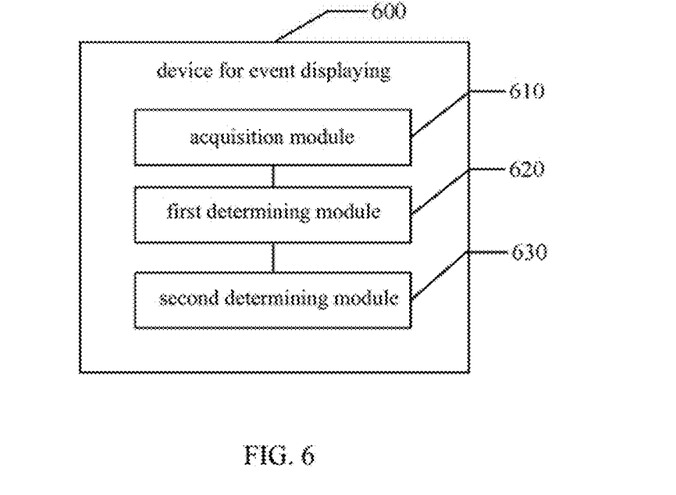
FIG. 6 schematically shows a schematic view of components of the device for event displaying according to an exemplary embodiment of the present disclosure.

In the following, embodiments of device of the present disclosure are provided, which may be used to implement the method for event displaying of the present disclosure. In addition, in an exemplary embodiment of the present disclosure, a device for event displaying is also provided. Referring to FIG. 6, a device for event displaying 600 includes an acquisition module 610, a first determining module 620 and a second determining module 630.

The acquisition module 610 may be used to acquire a plurality of events to be displayed, and acquire parameter information of a plurality of users in a preset area. The first determining module 620 may be used to determine the probabilities of the events to be displayed being triggered according to the parameter information. The second determining module 630 determines a duration of the event to be displayed in the preset area according to the probability.

The functional modules of the device for event displaying of the exemplary embodiment of the present disclosure correspond to the steps of the method for event displaying of the exemplary embodiment. As for undisclosed details in the embodiment of the device of the present disclosure, it is referred to the embodiments of the method for event displaying of the present disclosure.

It should be noted that although several modules or units of a device for carrying actions are mentioned in the detailed descriptions above, such division is not mandatory. In fact, features and functions of two or more of the modules or units described above may be embodied in one module or unit in accordance with the embodiments of the present disclosure. Conversely, the features and functions of one module or unit described above may be further embodied by multiple modules or units.

In addition, in an exemplary embodiment of the present disclosure, an electronic device capable of displaying events is also provided.

The skilled person in the art could understand that various aspects of the present disclosure may be implemented as systems, methods or program products. Therefore, various aspects of the present disclosure may be embodied in following forms, that is, an entire hardware embodiment, an entire software embodiment (including firmware, microcode, etc.), or an embodiment combining aspects of the hardware and the software, which may be collectively referred to as a "circuit", "module" or "system".

An electronic device 700 according to an embodiment of the present disclosure is described below with reference to FIG. 7. The electronic device 700 shown in FIG. 7 is only an example, and should not be limited to functions and application of the embodiments of the present disclosure.

Figure 7:
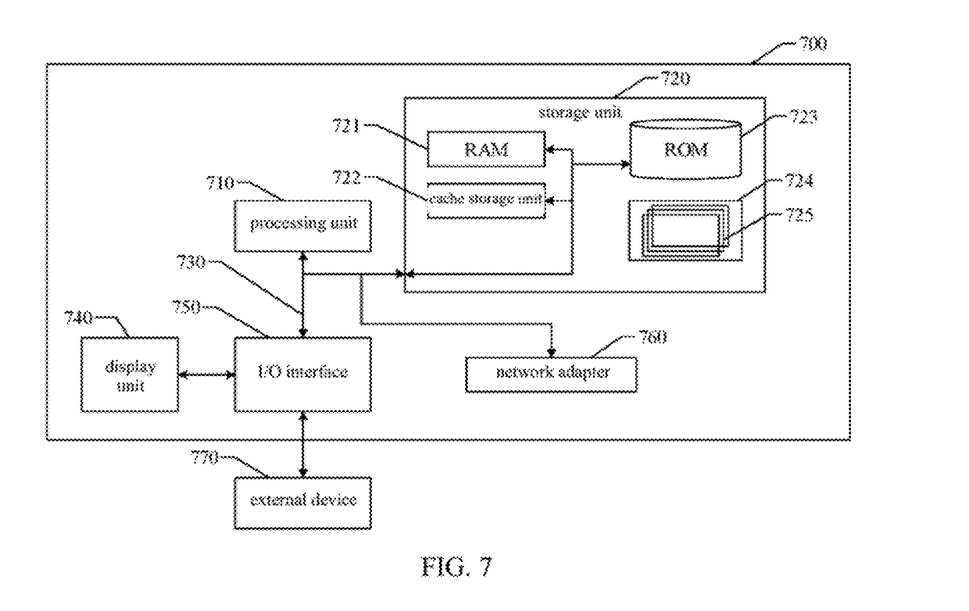
FIG. 7 schematically shows a structural schematic view of a computer system suitable for an electronic device used to implement the exemplary embodiment of the present disclosure.

As shown in FIG. 7, the electronic device 700 may be represented in the form of a general computing device. Components of the electronic device 700 may include, but are not limited to, at least one processing unit 710, at least one storage unit 720, a bus 730 connected to different system components (including the storage unit 720 and the processing unit 710), and a display unit 740.

Program codes are stored in the storage unit, and may be executed by the processing unit 710, so that the processing unit 710 performs the steps according to various exemplary embodiments of the present disclosure described in the above-mentioned "exemplary method" section of this specification. For example, the processing unit 710 may perform the following steps as shown in FIG. 1, i.e., S110: acquiring a plurality of events to be displayed, and acquiring parameter information of a plurality of users in a preset area; S120: determining probabilities of the events to be displayed being triggered according to the parameter information; S130: determining a duration of the events to be displayed in the preset area according to the probabilities.

Figure 3:
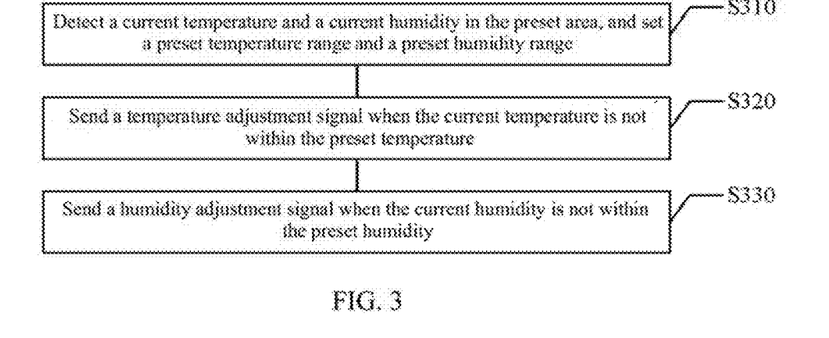
FIG. 3 schematically shows a flowchart of detecting temperature and humidity and adjusting the temperature and the humidity according to an exemplary embodiment of the present disclosure.

For another example, the electronic device may implement the steps shown in FIGS. 1 and 3.

The storage unit 720 may include a readable medium in the form of a volatile storage unit, such as a random access storage unit (RAM) 721 and/or a cache storage unit 722, and may further include a read-only storage unit (ROM) 723.

The storage unit 720 may also include a program/utility 724 with a set of (at least one) program modules 725. Such program modules 725 include, but are not limited to, an operating system, one or more application programs, other program modules, and program data, and each of or any combination of these examples may include implementation of a network environment.

The bus 730 may represent one or more of several types of bus structures, including a storage unit bus or a storage unit controller, a peripheral bus, a graphic acceleration port, a processing unit, or a local bus using any of a variety of bus structures.

The electronic device 700 may also communicate with one or more external devices 770 (e.g., a keyboard, a pointing device, a Bluetooth device, etc.), one or more devices that enable users to interact with the electronic device 700, and/or any device that enables the electronic device 700 to communicate with one or more other computing devices (e.g., a router, a modem, etc.). Such communication may be performed through an input/output (I/O) interface 750. Moreover, the electronic device 700 may also communicate with one or more networks (such as a local area network (LAN), a wide area network (WAN) and/or a public network, such as Internet) through a network adapter 760. As shown, the network adapter 760 communicates with other modules of the electronic device 700 through the bus 730. It should be understood that other hardware and/or software modules may be used in combination with the electronic device 700 (not shown), including but not limited to a microcode, a device driver, a redundant processing unit, an external disk drive array, a RAID system, a tape driver, a data backup storage system, etc.

It is easy for the skilled person in the art to understand through the description of the above embodiments that the exemplary embodiments described herein may be realized by software or by software combined with necessary hardware. Therefore, the technical solution according to the embodiment of the present disclosure may be embodied in the form of a software product. The software product may be stored in a non-volatile storage medium (such as a CD-ROM, a USB flash disk, a mobile hard disk, etc.) or on a network, and includes several instructions to permit a computing device (such as a personal computer, a server, a terminal device, or a network device, etc.) to execute the method according to the embodiment of the present disclosure.

In an exemplary embodiment of the present disclosure, a computer-readable storage medium is also provided, on which a program product capable of implementing the above method of this specification is stored. In some possible embodiments, various aspects of the present disclosure may also be implemented in the form of a program product which includes program codes for enabling a terminal device to perform the steps according to various exemplary embodiments of the present disclosure described in the above-mentioned "exemplary method" section of this specification when the program product is running on the terminal device.

Figure 8:
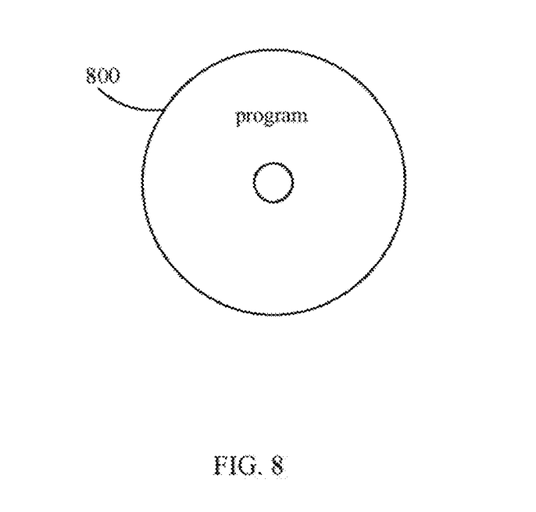
FIG. 8 schematically shows a schematic view of a computer-readable storage medium according to some embodiments of the present disclosure.

Referring to FIG. 8, it is described that a program product 800 for implementing the above-mentioned method according to an embodiment of the present disclosure may adopt a portable compact disk read-only memory (CD-ROM) and include program codes, and may be performed on the terminal device, such as a personal computer. However, the program product of the present disclosure is not limited thereto. Herein, the readable storage medium may be any tangible medium that contains or stores a program used by or in connection with an instruction execution system, device or element.

The program product may adopt any combination of one or more readable medias. The readable medium may be a readable signal medium or a readable storage medium. The readable storage medium may be, for example, but not limited to, an electronic, magnetic, optical, electromagnetic, infrared, or semiconductor system, device or element, or any combination thereof. Examples of readable storage media (not exhaustive) include an electrical connection with one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

A computer-readable signal medium may include a data signal propagated in a baseband or as part of a carrier wave, in which readable program codes are carried. The propagated data signal may be presented in various forms, including but not limited to, electromagnetic signal, optical signal or any suitable combination thereof. The readable signal medium may also be any readable medium other than the readable storage medium, which may send, propagate or transmit a program used by or in connection with an instruction execution system, device or element.

The program code included on the readable medium may be transmitted by any suitable medium, including but not limited to, wireless, wired, optical cable. RF, etc., or any suitable combination thereof.

The program codes for performing operations of the present disclosure may be written in any combination of one or more programming languages, including object-oriented programming languages, such as Java, C++, etc., and conventional procedural programming languages, such as "C" language or similar programming languages. The program codes may be executed completely on the user computing device, partially on the user computing device, as an independent software package, partially on the user computing device and partially on the remote computing device, or completely on the remote computing device or server. In the case that the remote computing device is included, the remote computing device may be connected to the user computing device through any kind of network, including a local area network (LAN) or a wide area network (WAN), or may be connected to an external computing device (for example, using Internet service providers to connect through the Internet).

In addition, the drawings as described above are only schematic illustrations of the processes included in the method according to the exemplary embodiment of the present disclosure, and are not limitative. It should be easily understood that processes shown in the drawings do not indicate or limit a time sequence of these processes. In addition, it should also be easily understood that these processes may be executed synchronously or asynchronously in several modules, for example.

Other embodiments of the disclosure will be apparent to the skilled person in the art under consideration of the specification and practice of the disclosure disclosed herein. This application is intended to cover any variations, uses, or adaptations of the present disclosure, in general, the principles of the disclosure and including such departures from the present disclosure as come within known or customary practice in the art to which the disclosure pertains. It is intended that the specification and examples be considered as exemplary only, with a true scope and spirit of the disclosure being indicated by the following claims.

It will be understood that the present disclosure is not limited to the precise arrangements that have been described above and shown in the drawings, and may be modified and changed without departing from the scope thereof. The scope of the present disclosure is limited only by the appended claims.

What is claimed is:

1. A method for event displaying in a preset area, performed by an electronic device, wherein the preset area comprises at least one display device, the display device is connected to the electronic device and configured for event displaying, and the method comprises:
   acquiring a plurality of events to be displayed, and acquiring parameter information of a plurality of users in the preset area;
   determining, according to the parameter information, probabilities of the events to be displayed being triggered; and
   determining, according to the probabilities of the events to be displayed, a ratio of durations of the events to be displayed in the preset area, thereby causing the display device to display the events according to the ratio of the durations of the events.

2. The method according to claim 1, wherein the parameter information comprises user data information, and acquiring the parameter information of the plurality of users in the preset area comprises:
   acquiring face information of the users in the preset area;
   matching the user data information of the users in an information base according to the face information.

3. The method according to claim 1, wherein the parameter information further comprises user behavior information, and acquiring the parameter information of the plurality of users in the preset area comprises:
   detecting a movement trajectory of the user in a preset time;
   determining the user behavior information according to the preset time and the movement trajectory.

4. The method according to claim 3, wherein the at least one display device comprises a plurality of display devices, and the method further comprises:
   acquiring position information of each of the display devices;
   determining a display position of the event to be displayed according to the user behavior information and the position information.

5. The method according to claim 4, wherein determining the display position of the event to be displayed according to the user behavior information and the position information, comprises:
   detecting a number of users in a preset range of the display devices;
   determining the display position of the event to be displayed according to the number of users and the probabilities.

6. The method according to claim 1, wherein determining the probabilities of the events to be displayed being triggered according to the parameter information, comprises:
   acquiring a pre-trained neural network model, an input of which refers to the parameter information of the plurality of users, and an output of which refers to the probabilities of the events to be displayed being triggered;
   inputting the parameter information of the users into the neural network model, and determining the probabilities of the events to be displayed being triggered.

7. The method according to claim 1, wherein the duration of the event to be displayed is positively correlated with the probability of the event to be displayed.

8. A non-transitory computer-readable storage medium on which a computer program is stored, wherein the program, when executed by a processor, implements a method for event displaying in a preset area, the preset area comprises at least one display device, the display device is connected to the processor and configured for event displaying, and the method comprises:
　acquiring a plurality of events to be displayed, and acquiring parameter information of a plurality of users in h preset area;
　determining, according to the parameter information, probabilities of the events to be displayed being triggered; and
　determining, according to the probabilities of the events to be displayed, a ratio of durations of the events to be displayed in the preset area, thereby causing the display device to display the events according to the ratio of the durations of the events.

9. The non-transitory computer-readable storage medium according to claim 8, wherein the parameter information comprises user data information, and acquiring the parameter information of the plurality of users in the preset area comprises:
　acquiring face information of the users in the preset area;
　matching the user data information of the users in an information base according to the face information.

10. The non-transitory computer-readable storage medium according to claim 8, wherein the parameter information further comprises user behavior information, and acquiring the parameter information of the plurality of users in the preset area comprises:
　detecting a movement trajectory of the user in a preset time;
　determining the user behavior information according to the preset time and the movement trajectory.

11. The non-transitory computer-readable storage medium according to claim 10, wherein the at least one display device comprises a plurality of display devices, and the method further comprises:
　acquiring position information of each of the display devices;
　determining a display position of the event to be displayed according to the user behavior information and the position information.

12. The non-transitory computer-readable storage medium according to claim 11, wherein determining the display position of the event to be displayed according to the user behavior information and the position information, comprises:
　detecting a number of users in a preset range of the display devices;
　determining the display position of the event to be displayed according to the number of users and the probabilities.

13. The non-transitory computer-readable storage medium according to claim 8, wherein determining the probabilities of the events to be displayed being triggered according to the parameter information, comprises:
　acquiring a pre-trained neural network model, an input of which refers to the parameter information of the plurality of users, and an output of which refers to the probabilities of the events to be displayed being triggered;
　inputting the parameter information of the users into the neural network model, and determining the probabilities of the events to be displayed being triggered.

14. An electronic device, connected to at least one display device in a preset area, wherein the display device is configured for event displaying, and the electronic device comprises:
　one or more processors; and
　a memory configured to store one or more programs, so that the one or more processors implement a method for event displaying when the one or more programs are executed by the one or more processors,
　wherein the method comprises:
　acquiring a plurality of events to be displayed, and acquiring parameter information of a plurality of users in the preset area;
　determining, according to the parameter information, probabilities of the events to be displayed being triggered; and
　determining, according to the probabilities of the events to be displayed, a ratio of durations of the events to be displayed in the preset area, thereby causing the display device to display the events according to the ratio of the durations of the events.

15. The electronic device according to claim 14, wherein the parameter information comprises user data information, and acquiring the parameter information of the plurality of users in the preset area comprises:
　acquiring face information of the users in the preset area;
　matching the user data information of the users in an information base according to the face information.

16. The electronic device according to claim 14, wherein the parameter information further comprises user behavior information, and acquiring the parameter information of the plurality of users in the preset area comprises:
　detecting a movement trajectory of the user in a preset time;
　determining the user behavior information according to the preset time and the movement trajectory.

17. The electronic device according to claim 16, wherein the at least one display device comprises a plurality of display devices, and the method further comprises:
　acquiring position information of each of the display devices;
　determining a display position of the event to be displayed according to the user behavior information and the position information.

18. The electronic device according to claim 17, wherein determining the display position of the event to be displayed according to the user behavior information and the position information, comprises:
　detecting a number of users in a preset range of the display devices;
　determining the display position of the event to be displayed according to the number of users and the probabilities.

19. The electronic device according to claim 14, wherein determining the probabilities of the events to be displayed being triggered according to the parameter information, comprises:
　acquiring a pre-trained neural network model, an input of which refers to the parameter information of the plurality of users, and an output of which refers to the probabilities of the events to be displayed being triggered;

inputting the parameter information of the users into the neural network model, and determining the probabilities of the events to be displayed being triggered.

20. The electronic device according to claim 14, wherein the duration of the event to be displayed is positively correlated with the probability of the event to be displayed.

\* \* \* \* \*